(12) United States Patent
Dershem (10) Patent No.: US 7,825,188 B2
(45) Date of Patent: Nov. 2, 2010

(54) THERMOPLASTIC ELASTOMER WITH ACYLOXYPHENYL HARD BLOCK SEGMENT

(75) Inventor: Stephen M Dershem, San Diego, CA (US)

(73) Assignee: Designer Molecules, Inc., San Diego, CA (US)

( * ) Notice: Subject to any disclaimer, the term of this patent is extended or adjusted under 35 U.S.C. 154(b) by 341 days.

(21) Appl. No.: 11/960,683

(22) Filed: Dec. 19, 2007

(65) Prior Publication Data

US 2008/0146738 A1    Jun. 19, 2008

Related U.S. Application Data

(60) Provisional application No. 60/875,574, filed on Dec. 19, 2006.

(51) Int. Cl.
C08L 63/00 (2006.01)
C08L 63/02 (2006.01)
C08L 63/04 (2006.01)
C08L 53/00 (2006.01)

(52) U.S. Cl. .................. 525/92 H; 525/20; 525/282; 525/284; 525/285; 525/286; 525/297; 525/298; 525/299; 525/303; 525/308; 525/312

(58) Field of Classification Search ................ None
See application file for complete search history.

(56) References Cited

U.S. PATENT DOCUMENTS

| 3,409,589 A | 11/1968 | Kine |
| 4,111,879 A | 9/1978 | Mori et al. |
| 4,395,462 A | 7/1983 | Polmanteer |
| 4,705,716 A | 11/1987 | Tang |
| 4,968,738 A | 11/1990 | Dershem |
| 5,026,794 A | 6/1991 | Ho et al. |
| 5,045,127 A | 9/1991 | Dershem et al. |
| 5,064,480 A | 11/1991 | Dershem et al. |
| 5,232,962 A | 8/1993 | Dershem et al. |
| 5,250,629 A | 10/1993 | Tani et al. |
| 5,306,333 A | 4/1994 | Dershem et al. |
| 5,358,992 A | 10/1994 | Dershem et al. |
| 5,403,389 A | 4/1995 | Dershem |
| 5,418,290 A * | 5/1995 | Machida et al. ............ 525/88 |

(Continued)

FOREIGN PATENT DOCUMENTS

EP    0393713    6/1994

(Continued)

OTHER PUBLICATIONS

Peter Callais & Scott Schmidt, "New Polymerization Technologies for Advanced Materials" Arkema, Inc. Presentation, Dec. 20, 2007(King of Prussia, PA).

(Continued)

*Primary Examiner*—Robert Sellers
(74) *Attorney, Agent, or Firm*—The Law Office of Jane K. Babin, Professional Corporation; Jane K. Babin (57) ABSTRACT

The present invention provides curatives for thermosetting adhesive compositions, methods of preparation and uses thereof. In particular, the present invention relates to elastomeric epoxy curative compounds that can be used in thermosetting compounds, methods for preparing the curative compounds and epoxy compositions containing the curative compounds.

17 Claims, 1 Drawing Sheet

Source: Arkema, Inc. product literature

U.S. PATENT DOCUMENTS

| | | |
|---|---|---|
| 5,447,988 A | 9/1995 | Dershem et al. |
| 5,489,641 A | 2/1996 | Dershem |
| 5,602,205 A | 2/1997 | Singh et al. |
| 5,646,241 A | 7/1997 | Dershem et al. |
| 5,714,086 A | 2/1998 | Osuna et al. |
| 5,717,034 A | 2/1998 | Dershem et al. |
| 5,718,941 A | 2/1998 | Dershem et al. |
| 5,753,748 A | 5/1998 | Dershem et al. |
| 5,861,111 A | 1/1999 | Dershem et al. |
| 5,969,036 A | 10/1999 | Dershem |
| 5,973,166 A | 10/1999 | Mizori et al. |
| 5,990,210 A | 11/1999 | Wideman et al. |
| 6,034,194 A | 3/2000 | Dershem |
| 6,034,195 A | 3/2000 | Dershem |
| 6,121,358 A | 9/2000 | Dershem et al. |
| 6,187,886 B1 | 2/2001 | Husson, Jr. et al. |
| 6,211,320 B1 | 4/2001 | Dershem et al. |
| 6,383,653 B1 * | 5/2002 | Vaidya ................. 428/511 |
| 6,423,780 B1 | 7/2002 | Dershem et al. |
| 6,429,281 B1 | 8/2002 | Dershem et al. |
| 6,521,731 B2 | 2/2003 | Dershem et al. |
| 6,620,946 B2 | 9/2003 | Dershem et al. |
| 6,743,852 B2 | 6/2004 | Dershem et al. |
| 6,750,301 B1 | 6/2004 | Bonneau et al. |
| 6,790,597 B2 | 9/2004 | Dershem |
| 6,825,245 B2 | 11/2004 | Dershem |
| 6,831,132 B2 | 12/2004 | Liu et al. |
| 6,852,814 B2 | 2/2005 | Dershem et al. |
| 6,916,856 B2 | 7/2005 | Dershem |
| 6,946,523 B2 | 9/2005 | Dershem et al. |
| 6,960,636 B2 | 11/2005 | Dershem et al. |
| 6,963,001 B2 | 11/2005 | Dershem et al. |
| 7,102,015 B2 | 9/2006 | Dershem et al. |
| 7,119,160 B2 | 10/2006 | Kodama et al. |
| 7,157,587 B2 | 1/2007 | Mizori et al. |
| 7,176,044 B2 | 2/2007 | Forray et al. |
| 7,199,249 B2 | 4/2007 | Liu et al. |
| 7,208,566 B2 | 4/2007 | Mizori et al. |
| 7,285,613 B2 | 10/2007 | Dershem et al. |
| 7,309,724 B2 | 12/2007 | Dershem et al. |
| 7,517,925 B2 | 4/2009 | Dershem et al. |
| 7,582,078 B2 * | 9/2009 | Chen et al. ................. 604/524 |
| 7,678,879 B2 | 3/2010 | Dershem |
| 2002/0062923 A1 | 5/2002 | Forray |
| 2002/0099168 A1 | 7/2002 | Dershem et al. |
| 2002/0188137 A1 | 12/2002 | Dershem et al. |
| 2002/0193541 A1 | 12/2002 | Dershem et al. |
| 2002/0198356 A1 | 12/2002 | Dershem et al. |
| 2003/0008992 A1 | 1/2003 | Dershem et al. |
| 2003/0055121 A1 | 3/2003 | Dershem et al. |
| 2003/0060531 A1 | 3/2003 | Dershem et al. |
| 2003/0087999 A1 | 5/2003 | Dershem et al. |
| 2003/0109666 A1 | 6/2003 | Dershem et al. |
| 2003/0120077 A1 | 6/2003 | Galbo et al. |
| 2003/0125551 A1 | 7/2003 | Dershem et al. |
| 2003/0178138 A1 | 9/2003 | Taukagoshi |
| 2003/0199638 A1 | 10/2003 | Liu et al. |
| 2003/0208016 A1 | 11/2003 | Dershem et al. |
| 2004/0006166 A1 | 1/2004 | Liu et al. |
| 2004/0019224 A1 | 1/2004 | Dershem et al. |
| 2004/0077798 A1 | 4/2004 | Dershem et al. |
| 2004/0082724 A1 | 4/2004 | Dershem et al. |
| 2004/0102566 A1 | 5/2004 | Forray et al. |
| 2004/0123948 A1 | 7/2004 | Dershem et al. |
| 2004/0225026 A1 | 11/2004 | Mizori et al. |
| 2004/0225045 A1 | 11/2004 | Forray |
| 2004/0225059 A1 | 11/2004 | Mizori et al. |
| 2005/0107542 A1 | 5/2005 | Liu et al. |
| 2005/0119362 A1 | 6/2005 | Ishikawa |
| 2005/0136620 A1 | 6/2005 | Dershem et al. |
| 2005/0137277 A1 | 6/2005 | Dershem et al. |
| 2005/0267254 A1 | 12/2005 | Mizori et al. |
| 2005/0272888 A1 | 12/2005 | Dershem et al. |
| 2006/0009578 A1 | 1/2006 | Dershem |
| 2006/0063014 A1 | 3/2006 | Forray |
| 2006/0069232 A1 | 3/2006 | Dershem |
| 2006/0089447 A1 | 4/2006 | Robertson et al. |
| 2006/0116476 A1 | 6/2006 | Cheng |
| 2006/0142517 A1 | 6/2006 | Dershem |
| 2006/0171981 A1 * | 8/2006 | Richard et al. ............... 424/422 |
| 2007/0042173 A1 | 2/2007 | Nagaoka et al. |
| 2007/0117925 A1 * | 5/2007 | Strickler et al. ................ 525/88 |
| 2007/0155869 A1 | 7/2007 | Dershem et al. |
| 2007/0205399 A1 | 9/2007 | Mizori |
| 2007/0299154 A1 | 12/2007 | Dershem et al. |
| 2008/0017308 A1 | 1/2008 | Dershem et al. |
| 2008/0075961 A1 | 3/2008 | Mizori |
| 2008/0075963 A1 | 3/2008 | Dershem |
| 2008/0075965 A1 | 3/2008 | Dershem |
| 2008/0103240 A1 | 5/2008 | Dershem |
| 2008/0142158 A1 | 6/2008 | Dershem |
| 2008/0146738 A1 | 6/2008 | Dershem |
| 2008/0160315 A1 | 7/2008 | Forray et al. |
| 2008/0191173 A1 | 8/2008 | Dershem et al. |
| 2008/0210375 A1 | 9/2008 | Dershem et al. |
| 2008/0251935 A1 | 10/2008 | Dersham |
| 2008/0257493 A1 | 10/2008 | Dershem |
| 2008/0262191 A1 | 10/2008 | Mizori |
| 2009/0061244 A1 | 3/2009 | Dershem |
| 2009/0215940 A1 | 8/2009 | Dershem |
| 2009/0288768 A1 | 11/2009 | Dershem |
| 2010/0041803 A1 | 2/2010 | Dershem |
| 2010/0041823 A1 | 2/2010 | Dershem |
| 2010/0041832 A1 | 2/2010 | Dershem |
| 2010/0041845 A1 | 2/2010 | Dershem et al. |
| 2010/0056671 A1 | 3/2010 | Dershem |
| 2010/0063184 A1 | 3/2010 | Dershem |
| 2010/0113643 A1 | 5/2010 | Dershem |
| 2010/0144977 A1 | 6/2010 | Dershem |

FOREIGN PATENT DOCUMENTS

| | | | |
|---|---|---|---|
| EP | 1834969 | | 9/2007 |
| JP | 2-199127 A | * | 8/1990 |
| JP | 4-93318 A | * | 3/1992 |
| WO | WO 20040099331 | | 11/2004 |
| WO | WO-2005121190 | | 12/2005 |
| WO | WO-2007100329 | | 9/2007 |
| WO | WO-2008077141 | | 6/2008 |
| WO | WO-2008124797 | | 10/2008 |
| WO | WO-2008130894 | | 10/2008 |
| WO | WO-2009117729 | | 9/2009 |
| WO | WO-2010019832 | | 2/2010 |

OTHER PUBLICATIONS

Grenier-Loustalot, et al., "Monofunctional maleimide or acetylene terminated model compounds-I. Molten state homopolymerization reactivity and kinetics", *European Polymer Journal 34*: 1998, 1705-1714.

Mimura, et al., "Characteristics of epoxy resin cured with in situ polymerized curing agen", *Polymer 43*: 2002, 7559-7566.

Nakamura et al., "Epoxy Resins (Curing Reactions)", Polymeric Materials Encyclopedia (Salamone ed; CRC Press, Boca Raton, FL) 1996, 2238-46.

Nakamura et al., "Thermal analysis of epoxy curing using polyfunctional active esters as curing agents", *Thermochimica Acta 183*: 1991, 269-277.

Yamazaki et al., "Effect of N-substituents on polymerization reactivity of N-alkylitaconimides in radical polymerization", *European Polymer Journal 33*: 1997, 157-162.

* cited by examiner

FIGURE 1

THERMOPLASTIC ELASTOMER WITH ACYLOXYPHENYL HARD BLOCK SEGMENT

RELATED APPLICATIONS

This application claims the benefit of priority under 35 U.S.C. §119 of U.S. Provisional Applications Ser. No. 60/875,574 filed Dec. 19, 2006, the contents of which is incorporated by reference herein in its entirety.

FIELD OF THE INVENTION

The present invention relates to thermosetting adhesive compositions, methods of preparation and uses thereof. In particular, the present invention relates to elastomeric epoxy curatives that can be used in thermosetting compounds and compositions that are used as adhesives, and matrix resins.

BACKGROUND OF THE INVENTION

Epoxy resins are used to make commercially useful articles. They are also used in a variety of adhesive compositions. Epoxy resins are noted for their low cure shrinkage and excellent adhesive properties. They are polymerized through the highly strained epoxy ring either as homo-cured thermosets or in combination of a variety of curative synergists. Several curatives can be used to cure epoxy resins. These include amines, anhydrides, phenols, thiols, cyanates, and isocyanates.

A recently described class of epoxy curatives includes phenyl esters. The phenyl esters offer a number of advantages over traditional epoxy curatives. They are, for example, much more latent than most amines, cyanates, or isocyanates. They are much more stable toward moisture exposure than cyanates, especially as compared to anhydrides and isocyanates. They do not absorb carbon dioxide from the air like many of the amines. They don't have any of the malodorous issues associated with thiols. They do not poison free radical cure (an important feature for hybrid thermoset compositions that include epoxies and free radically polymerizable monomers) like phenols. They are also considerably lower in viscosity than the corresponding phenols. The thermosets made using phenyl esters are also generally more hydrophobic than those containing other epoxy curatives. The cure of a phenyl ester with an epoxy resin results in a continuous network of ether linkages with pendant secondary ester linkages. The polyether backbone of the final thermoset is considered to provide superior hydrolytic resistance. However, the epoxy-phenyl ester compositions previously described in the literature tend to be brittle.

SUMMARY OF THE INVENTION

Provided herein are rubber toughening curatives that enable the preparation of epoxy thermoset having reduced brittleness without degrading other important aspects of the epoxy thermoset performance. In one embodiment of the invention, living polyacrylate macromonomers are provided as tougheners in thermosetting resins.

In one embodiment, the present invention provides tougheners for epoxy resins that incorporate acyloxy bearing monomers. Thus, the invention provides a thermoplastic elastomer comprising at least one hard block segment, wherein the at least one hard block segment comprises at least one monomer compound having the formula:

here X is selected from optionally substituted $C_2$ to about $C_{10}$ alkylene, optionally substituted $C_2$ to about $C_{10}$ oxyalkylene, an acrylate, a methyacrylate, a maleimide, and a vinyl ether; and $R_2$ is methyl, ethyl, propyl, butyl, or phenyl. In some embodiments, the thermoplastic elastomer contains curative functional groups. I certain embodiments, the at least one hard block segment is repeated.

In certain embodiments of the invention, the repeated hard block segment comprises at least one monomer compound having a formula selected from:

C-1

C-2

C-3 where R₁ is H or methyl; and R₂ is methyl, ethyl, propyl, butyl, or phenyl.

The invention also provides methods for synthesizing the thermoplastic elastomer of claim 1, comprising incorporating into the hard segment of a block polymer at least one monomer of formula I wherein X is selected from vinyl, an acrylate, a methyacrylate, a maleimide, and a vinyl ether; and R₂ is methyl, ethyl, propyl, butyl, or phenyl.

Also provided by the invention is a composition including a thermoplastic elastomer of formula 1 and an epoxy. In certain embodiments, the epoxy is a glycidyl ether epoxy, a cycloaliphatic epoxy, or a aliphatic epoxy. In certain other embodiments the epoxy is selected from a glycidyl ether of a phenol; a glycidyl ether of an amine; a glycidyl ether of an alcohol; a phenyl glycidyl ether; a cresyl glycidyl ether; a nonylphenyl glycidyl ether; a p-tert-butylphenyl glycidyl ether; a diglycidyl ether; a trisglycidyl ether of bisphenol A, bisphenol F, ethylidinebisphenol, dihydroxydiphenyl ether, N,N'-disalicylal-ethylenediamine, triglycidyl-p-aminophenol, N,N,N',N'-tetraglycidyl-4,4'-diphenylmethane, triglycidyl isocyanurate, bis(4-hydroxyphenyl)sulfone, bis(hydroxyphenyl)sulfide, 1,1-bis(hydroxyphenyl)cyclohexane, 9,19-bis(4-hydroxyphenyl)fluorene, 1,1,1-tris(hydroxyphenyl)ethane, tetrakis(4-hydroxyphenyl)ethane, trihydroxytritylmethane, 4,4'-(1-alpha-methylbenzylidene)bisphenol, 4,4'-(1,3-componentthylethylene)diphenol, componentthylstilbesterol, 4,4'-dihyroxybenzophenone, resorcinol, catechol, or tetrahydroxydiphenyl sulfide; a glycidyl ether of a cresol formaldehyde condensate; a glycidyl ether of a phenol formaldehyde condensate; a glycidyl ether of a cresol dicyclopentadiene addition compound; a glycidyl ether of a phenol dicyclopentadiene addition compound; a glycidyl ether of dihydroxy naphthalene, 2,2'-dihydroxy-6,6'-dinaphthyl disulfide, or 1,8,9-trihydroxyanthracene; a diglycidyl ether of 1,4 butanediol; a diglycidyl ether of diethylene glycol; a diglycidyl ether of neopentyl glycol; a diglycidyl ether of cyclohexane dimethanol; a diglycidyl ether of tricyclodecane dimethanol; a trimethyolethane triglycidyl ether; a trimethyol propane triglycidyl ether; a glycidyl ether of a polyglycol; a polyglycidyl ether of castor oil; a polyoxypropylene diglycidyl ether; a glycidyl derivative of an aromatic amine; Heloxy 71; glycidyl methacrylate; cyclohexene oxide; 3-vinylcyclohexene oxide; vinylcyclohexene dioxide; dicylcopentadiene dioxide; tricyclopentadiene dioxide; tetracyclopentadiene dioxide; norbornadiene dioxide; bis(2,3-epoxycyclopentyl) ether; limonene dioxide; 3',4'-epoxycyclohexamethyl-3,4-epoxycyclohexanecarboxylate; 3,4-epoxycyclohexyloxirane; 2(3',4'-epoxycyclohexyl)-5,1"-spiro-3",4"-epoxycyclohexane-1,3-dioxane; and bis(3,4-epoxycyclohexamethyl)adipate.

According to the invention, the epoxy can also be epoxidized polybutadiene; epoxidized polyisoprene; epoxidized poly(1,3-butadiene-acrylonitrile); epoxidized soybean oil; epoxidized castor oil; dimethylpentane dioxide; divinylbenzene dioxide; butadiene dioxide; or 1,7-octadiene dioxide.

In yet further embodiments, the composition can include a comonomer, such as styrene, t-butylstyrene, α-methylstyrene, vinyltoluene, methyl acrylate, ethyl acrylate, t-butyl acrylate, tetrahydrofurfuryl acrylate, 2-phenoxyethyl acrylate, glycidyl acrylate, isobornyl acrylate, 3-isobornylcyclohexyl acrylate, tricylcodecane-methyl acrylate, cyclohexyl acrylate, 3,3,5-trimethylcyclohexane acrylate, (3-ethyl-3-oxetanyl)methyl acrylate, N,N-dimethyl acrylamide, methyl methacrylate, ethyl methacrylate, t-butyl methacrylate, tetrahydrofurfuryl methacrylate, 2-phenoxyethyl methacrylate, glycidyl methacrylate, isobornyl methacrylate, 3-isobornylcyclohexyl methacrylate, tricylcodecane-methyl methacrylate, cyclohexyl methacrylate, 3,3,5-trimethylcyclohexane methacrylate, (3-ethyl-3-oxetanyl)methyl methacrylate, N,N-dimethyl methacrylamide, phenyl maleimide, 3-methyphenyl maleimide, 2,4-dimethylphenyl maleimide, 2-methylphenyl maleimide, 4-methylphenyl maleimide, 2-methoxyphenyl maleimide, 3-methoxyphenyl maleimide, 4-methoxyphenyl maleimide, 4-ethoxyphenyl maleimide, 2-ethyl-6-methylphenyl maleimide, 2,6-dimethylphenyl maleimide, 2,6-diethylphenyl maleimide, 2-isopropyl-6-methylphenyl maleimide, 2-phenoxyphenyl maleimide, 4-phenoxyphenyl maleimide, 2,4,6-trichlorophenyl maleimide, 2,4,6-tribromophenyl maleimide, dodecylphenyl maleimide, maleimide, maleic anhydride, phenyl citraconimide, 3-methyphenyl citraconimide, 2,4-dimethylphenyl citraconimide, 2-methylphenyl citraconimide, 4-methylphenyl citraconimide, 2-methoxyphenyl citraconimide, 3-methoxyphenyl citraconimide, 4-methoxyphenyl citraconimide, 4-ethoxyphenyl citraconimide, 2-ethyl-6-methylphenyl citaconimide, 2,6-dimethylphenyl citraconimide, 2,6-diethylphenyl citraconimide, 2-isopropyl-6-methylphenyl citraconimide, 2-phenoxyphenyl citraconimide, 4-phenoxyphenyl citraconimide, 2,4,6-trichlorophenyl citraconimide, 2,4,6-tribromophenyl citraconimide, dodecylphenyl citraconimide, citraconimide, and citraconic anhydride.

In yet other embodiments, the composition includes about 2 weight percent to about 45 weight percent of a thermoplastic elastomer of claim 1 and about 55 weight percent to about 98 about weight percent epoxy. In certain aspects of this embodiments, t the thermoplastic elastomer of comprises about 10 or 20 weight percent of the composition.

Also provided by the invention is a vulcanized rubber containing about 30 weight percent to about 55 weight percent of a thermoplastic elasotomer comprising at least one hard block segment that includes at least one monomer compound formula I and about 70 weight percent to about 45 about weight percent of an epoxy. In certain aspects of this embodiment the vulcanized rubber is 45 weight percent thermoplastic elastomer.

DETAILED DESCRIPTION OF THE INVENTION

It is to be understood that both the foregoing general description and the following detailed description are exemplary and explanatory only and are not restrictive of the invention claimed. As used herein, the use of the singular includes the plural unless specifically stated otherwise. As used herein, "or" means "and/or" unless stated otherwise. Furthermore, use of the term "including" as well as other forms, such as "includes," and "included," is not limiting.

The section headings used herein are for organizational purposes only and are not to be construed as limiting the subject matter described.

Definitions

Unless specific definitions are provided, the nomenclatures utilized in connection with, and the laboratory procedures and techniques of analytical chemistry, synthetic organic and inorganic chemistry described herein are those known in the art. Standard chemical symbols are used interchangeably with the full names represented by such symbols. Thus, for example, the terms "hydrogen" and "H" are understood to have identical meaning. Standard techniques may be used for chemical syntheses, chemical analyses, and formulation.

As used herein, "living" polymerization refers to a form of addition polymerization where the ability of a growing polymer chain to terminate has been removed.

As used herein, "aliphatic" refers to any alkyl, alkenyl, cycloalkyl, or cycloalkenyl moiety.

As used herein, "alkyl" refers to straight or branched chain hydrocarbyl groups having from 1 up to about 100 carbon atoms. Whenever it appears herein, a numerical range, such as "1 to 100" or "$C_1$-$C_{100}$", refers to each integer in the given range; e.g., "$C_1$-$C_{100}$ alkyl" means that an alkyl group may comprise only 1 carbon atom, 2 carbon atoms, 3 carbon atoms, etc., up to and including 100 carbon atoms, although the term "alkyl" also includes instances where no numerical range of carbon atoms is designated). "Substituted alkyl" refers to alkyl moieties bearing substituents including alkyl, alkenyl, alkynyl, hydroxy, oxo, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, haloalkyl, cyano, nitro, nitrone, amino, amido, —C(O)H, —C(O)—, —C(O)O—, —S—, —S(O)$_2$—, —OC(O)—O—, —NR—C(O)—, NR—C(O)—NR—, —OC(O)—NR—, wherein R is H or lower alkyl, acyl, oxyacyl, carboxyl, carbamate, sulfonyl, sulfonamide, sulfuryl, and the like.

As used herein, "cycloalkyl" refers to cyclic ring-containing groups typically containing in the range of about 3 up to about 8 carbon atoms, and "substituted cycloalkyl" refers to cycloalkyl groups further bearing one or more substituents as set forth above.

As used herein, "aryl" refers to aromatic groups having in the range of 6 up to 14 carbon atoms and "substituted aryl" refers to aryl groups further bearing one or more substituents as set forth above.

As used herein, "heterocyclic" refers to cyclic (i.e., ring-containing) groups containing one or more heteroatoms (e.g., N, O, S, or the like) as part of the ring structure, and having in the range of 3 up to 14 carbon atoms and "substituted heterocyclic" refers to heterocyclic groups further bearing one or more substituents as set forth above. The term heterocyclic is also intended to refer to heteroaromatic moieties. As used herein, "alkenyl" refers to straight or branched chain hydrocarbyl groups having at least one carbon-carbon double bond, and having in the range of about 2 up to about 100 carbon atoms, and "substituted alkenyl" refers to alkenyl groups further bearing one or more substituents as set forth above.

As used herein, "alkylene" refers to a divalent alkyl moiety, and "oxyalkylene" refers to an alkylene moiety containing at least one oxygen atom instead of a methylene (CH$_2$) unit. "Substituted alkylene" and "substituted oxyalkylene" refer to alkylene and oxyalkylene groups further bearing one or more substituents as set forth above.

As used herein, "arylene" refers to a divalent aryl moiety. "Substituted arylene" refers to arylene moieties bearing one or more substituents as set forth above.

As used herein, the term "acrylate" refers to a compound bearing at least one moiety having the structure:

As used herein, the term "methacrylate" refers to a compound bearing at least one moiety having the structure:

As used herein, the term "maleimide" refers to a compound bearing at least one moiety having the structure:

As used herein, the term "citraconimide" refers to a compound bearing at least one moiety having the structure:

As used herein, the term "epoxy" refers to a compound bearing at least one moiety having the structure:

As used herein, the term "vinyl ether" refers to a compound bearing at least one moiety having the structure:

As used herein, the term "acrylamide" refers to a compound bearing at least one moiety having the structure:

As used herein, the term "methacrylamide" refers to a compound bearing at least one moiety having the structure:

The present invention is based on the discovery of methods for combining the valuable features of phenyl ester epoxy curatives into a rubber toughener. Provided herein are rubber toughening curatives that enable the preparation of epoxy thermoset having reduced brittleness without degrading other important aspects of the epoxy thermoset performance.

The invention provides living polyacrylate macromonomers for use as tougheners in thermosetting resins. In one embodiment, the invention utilizes a poly(butyl acrylate) macromonomer. This macromonomer has a MW of about 60,000 and a $T_g$ of about $-60°$ C. The living free-radical macromonomers are capped with nitroxide end groups. This living end group permits the formation of thermoplastic elastomers, where high $T_g$ hard blocks can be grown from the low $T_g$ core. The thermoplastic elastomers of this invention incorporate epoxy curatives into their hard segments. These rubber epoxy curatives can be incorporated into a variety of thermosetting resins, such as epoxy matrix resins and adhesives.

The macromonomers currently available are telechelic di-functional compounds with two living free-radical end-groups. They are initiated from a di-functional acrylate monomer core and grown out from this core with the incorporation of butyl acrylate monomer. Tri-block polymers can then be made from this telechelic macromonomer by simply adding another ethylenic unsaturated monomer and heating the mixture to a temperature that is sufficient to reversibly decompose the living radical nitroxide end-group.

The invention also contemplates the use of mono-, tri-, or poly-functional acrylate core molecules to form the original macromonomer. Di-block polymers can also be made according to the invention where a mono-functional acrylate has been used as the core molecule. In another embodiment of the invention, star type polymers can be made where a tri-, tetra-, penta-, or hexa-functional acrylate is used as the core. In yet another embodiment of the invention, comb type polymers can be made if a polyacrylate functional oligomer or polymer is used as the core. The invention further contemplates the substitution of styrenyl functional compounds for acrylate monomers as the core.

The formation of the living macromonomers of the invention utilizes nitroxide initiators. One example of this of a nitroxide initiator is sold by Arkema (Colombes, France) under the trade name BlocBuilder®. A illustration of how this compound can be used to form a living, nitroxide end-capped poly(butyl acrylate) is shown in FIG. 1.

Figure 1:
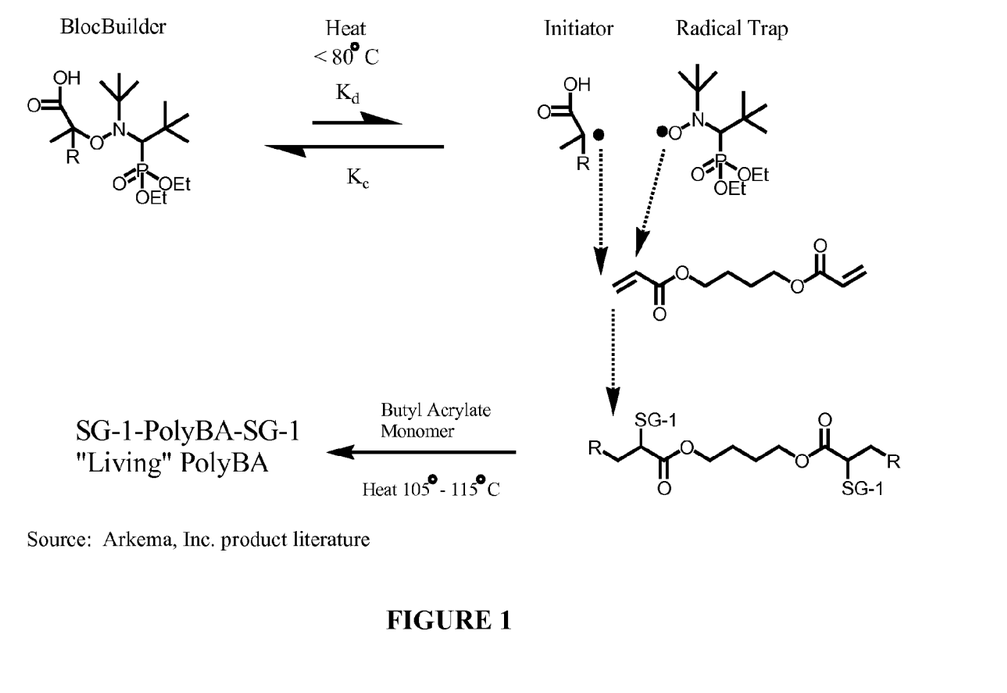
FIG. 1. shows a synthetic scheme for producing living polyacrylate macromonomers using a nitroxide initiator.

The living poly(butyl acrylate) macromonomer shown in FIG. 1 has a very low ($-60°$ C.) glass transition temperature. This low glass transition temperature makes this macromonomer an ideal mid-block for a thermoplastic elastomer, where the outer blocks are composed of segments with glass transitions that are above room temperature. A wide variety of ethylenically unsaturated monomers possessing glass transition temperatures greater than or equal to 30° C. are available. These monomers can be grown onto the living macromonomer as pure repeating unit segments, or in series, or as random co-polymer blocks. It is possible, with some combinations of electron rich and electron poor monomers, to form perfectly alternating monomer sequences.

Tri-block, and multi-block polymers with a low glass transition temperature central block are useful in themselves as thermoplastic elastomers. The present invention, however, provides significant expansion and improvement on this basic theme by incorporating secondary functionality into the outer blocks of these polymers. This secondary functionality is specifically present to provide multiple centers within the polymer backbone that will co-cure with epoxy thermoset resins.

According to the present invention, monomers are incorporated into the hard segments of block polymers that provide curative sites for epoxy resin thermosets. The polymers of this invention, therefore, provide the ideal main components or additives for epoxy based adhesive liquids and films, as well as for epoxy matrix resins. The key property that the compounds of the present invention bring to the final composition is toughness. Thus, relatively low levels of the polymers of the invention can be added to an epoxy thermoset to impart a significant benefit in terms of the fracture toughness of the cured resin. The benefit is further enhanced by co-cure of the functional groups pendant from the hard block segments resident in the polymers of this invention and the epoxy moieties in the bulk of the thermoset resin.

In one embodiment of the invention, co-cure of the polymer pendant functional groups as described herein with the epoxy resin matrix result in covalent linkages between the rubber and high glass transition phases. The skilled artisan will appreciate that covalent bonding of a rubber toughener within a thermoset matrix, is superior to a simple physical or a non-bonded, phase separated dispersion.

The present invention provides functional monomers that impart epoxy curative properties to the hard segments include acyloxy bearing monomer set forth in formula (I):

I where X is selected from optionally substituted $C_2$ to about $C_{10}$ alkylene, optionally substituted $C_2$ to about $C_{10}$ oxyalkylene, an acrylate, a methyacrylate, a maleimide, and a vinyl ether; and

$R_2$ is methyl, ethyl, propyl, butyl, or phenyl.

Exemplary monomers of the present invention include the compounds shown below as C-1 through C-7:

C-1

C-2

C-3

C-4

C-5

C-6

C-7 where $R_1$ is H, or methyl; and
$R_2$ is $R_2$ is methyl, ethyl, propyl, butyl, or phenyl.

In one embodiment, monomers of the invention bear polymerizable ethylenic unsaturation, which allows them to be incorporated into the backbone of the growing macromonomer. Monomers C-1 through C-5 can be polymerized independently into the growing chain, while monomers C-6 and C-7 require an electron poor (e.g. monomaleimide or acylate) co-monomer. The acyloxy moieties, present in all monomers of the invention, provide two important functions. The phenyl ester groups are reactive with, and will act as curatives for epoxy compounds. The acyloxy functionality, unlike the corresponding free phenols, also eliminates any interference with free radical cure. This feature is important because the presence of a free phenol would interfere with the growth of the desired polymer chain and prevent the formation of a viable thermoplastic elastomer.

Invention monomers C-1 through C-5 could be incorporated as homo-polymer hard segments at the end of the macro-monomer thermoplastic elastomers. In certain embodiments, it may be desirable to combine monomers of the invention with one or more comonomers. Examples of such comonomers include, styrene, t-butylstyrene, α-methylstyrene, vinyltoluene, methyl acrylate, ethyl acrylate, t-butyl acrylate, tetrahydrofurfuryl acrylate, 2-phenoxyethyl acrylate, glycidyl acrylate, isobornyl acrylate, 3-isobornylcyclohexyl acrylate, tricylcodecane-methyl acrylate, cyclohexyl acrylate, 3,3,5-trimethylcyclohexane acrylate, (3-ethyl-3-oxetanyl)methyl acrylate, N,N-dimethyl acrylamide, methyl methacrylate, ethyl methacrylate, t-butyl methacrylate, tetrahydrofurfuryl methacrylate, 2-phenoxyethyl methacrylate, glycidyl methacrylate, isobornyl methacrylate, 3-isobornylcyclohexyl methacrylate, tricylcodecane-methyl methacrylate, cyclohexyl methacrylate, 3,3,5-trimethylcyclohexane methacrylate, (3-ethyl-3-oxetanyl)methyl methacrylate, N,N-dimethyl methacrylamide, phenyl maleimide, 3-methyphenyl maleimide, 2,4-dimethylphenyl maleimide, 2-methylphenyl maleimide, 4-methylphenyl maleimide, 2-methoxyphenyl maleimide, 3-methoxyphenyl maleimide, 4-methoxyphenyl maleimide, 4-ethoxyphenyl maleimide, 2-ethyl-6-methylphenyl maleimide, 2,6-dimethylphenyl maleimide, 2,6-diethylphenyl maleimide, 2-isopropyl-6-methylphenyl maleimide, 2-phenoxyphenyl maleimide, 4-phenoxyphenyl maleimide, 2,4,6-trichlorophenyl maleimide, 2,4,6-tribromophenyl maleimide, dodecylphenyl maleimide, maleimide, maleic anhydride, phenyl citraconimide, 3-methyphenyl citraconimide, 2,4-dimethylphenyl citraconimide, 2-methylphenyl citraconimide, 4-methylphenyl citraconimide, 2-methoxyphenyl citraconimide, 3-methoxyphenyl citraconimide, 4-methoxyphenyl citraconimide, 4-ethoxyphenyl citraconimide, 2-ethyl-6-methylphenyl citaconimide, 2,6-dimethylphenyl citraconimide, 2,6-diethylphenyl citraconimide, 2-isopropyl-6-methylphenyl citraconimide, 2-phenoxyphenyl citraconimide, 4-phenoxyphenyl citraconimide, 2,4,6-trichlorophenyl citraconimide, 2,4,6-tribromophenyl citraconimide, dodecylphenyl citraconimide, citraconimide, citraconic anhydride, and the like.

The acyloxy functional rubbers of the present invention are designed to co-cure with epoxy monomers. The rubber additives described here will principally be used at levels between about 2 weight percent and about 30 weight percent (of the total resin composition) as tougheners for the epoxy thermosets. It may be desirable in some instances to have higher levels of the invention compounds, such as up to about 35 weight percent, up to about 40 weight percent, up to about 45 weight percent. In certain embodiments acyloxy functional rubbers of the invention may be the dominant phase with the epoxy monomers added to vulcanize the rubbers in a thermoset step. In such embodiments, the acyloxy functional rubbers are present at about 55 weight percent to about 98 weight percent of the composition.

Then present invention also provides compositions containing a functional thermoplastic elastomer comprised of monomeric repeat units of formula I and an epoxy. These compounds may also optionally contain one or more catalysts, one or more fillers, and one or more coupling agents.

Epoxy compounds suitable for use in the compositions of this invention include, but are not limited to glycidyl ether epoxies, cycloaliphatic epoxies, and aliphatic epoxies. Generally, the epoxy compounds of the compositions of the invention will have at least two epoxy moieties per molecule.

Exemplary glycidyl ether epoxy resins contemplated for use in the practice of the invention include, but are not limited to: a glycidyl ether of a phenol; an amine; an alcohol; an isocyanurate such as a phenyl glycidyl ether, a cresyl glycidyl ether, a nonylphenyl glycidyl ether, or a p-tert-butylphenyl glycidyl ether; a diglycidyl ether; a trisglycidyl ether of a phenolic compound selected from bisphenol A, bisphenol F, ethylidinebisphenol, dihydroxydiphenyl ether, N,N'-disalicylal-ethylenediamine, triglycidyl-p-aminophenol, N,N,N', N'-tetraglycidyl-4,4'-diphenylmethane, triglycidyl isocyanurate, bis(4-hydroxyphenyl)sulfone, bis(hydroxyphenyl)sulfide, 1,1-bis(hydroxyphenyl)cyclohexane, 9,19-bis(4-hydroxyphenyl)fluorene, 1,1,1-tris(hydroxyphenyl)ethane, tetrakis(4-hydroxyphenyl)ethane, trihydroxytritylmethane, 4,4'-(1-alpha-methylbenzylidene)bisphenol, 4,4'-(1,3-componentthylethylene)diphenol, componentthylstilbesterol, 4,4'-dihydroxybenzophenone, resorcinol, catechol, or tetrahydroxydiphenyl sulfide; a glycidyl ether of a cresol formaldehyde condensate; a glycidyl ether of a phenol formaldehyde condensate; a glycidyl ether of a cresol dicyclopentadiene addition compound; a glycidyl ether of a phenol dicyclopentadiene addition compound; a glycidyl ether of a fused ring polyaromatic phenol selected from dihydroxy naphthalene, 2,2'-dihydroxy-6,6'-dinaphthyl disulfide, and 1,8,9-trihydroxyanthracene; diglycidyl ether; a glycidyl ether of an aliphatic alcohol selected from a diglycidyl ether of 1,4 butanediol, a diglycidyl ether of diethylene glycol, a diglycidyl ether of neopentyl glycol, a diglycidyl ether of cyclohexane dimethanol, a diglycidyl ether of tricyclodecane dimethanol, a trimethyolethane triglycidyl ether, and a trimethyol propane triglycidyl ether; a glycidyl ether of a polyglycol selected from Heloxy 84™, Heloxy 32™, a polyglycidyl ether of castor oil, and a polyoxypropylene diglycidyl ether; a glycidyl derivative of an aromatic amine; an ester linked epoxy, such as Heloxy 71, glycidyl Methacrylate, and the like. Other glycidyl ether epoxies contemplated here include homo- and co-polymers based on allyl glycidyl ether.

Exemplary cycloaliphatic epoxy compounds contemplated for use in the practice of the invention include, but are not limited to, cyclohexene oxide; 3-vinylcyclohexene oxide; vinylcyclohexene dioxide; dicylcopentadiene dioxide; tricyclopentadiene dioxide; tetracyclopentadiene dioxide; norbornadiene dioxide; bis(2,3-epoxycyclopentyl)ether; limonene dioxide; 3',4'-epoxycyclohexamethyl-3,4-epoxycyclohexanecarboxylate; 3,4-epoxycyclohexyloxirane; 2(3',4'-epoxycyclohexyl)-5,1"-spiro-3",4"-epoxycyclohexane-1,3-dioxane; bis (3,4-epoxycyclohexamethyl)adipate; and the like.

Exemplary aliphatic epoxy compounds contemplated for use in the practice of the invention include, but are not limited to, epoxidized polybutadiene; epoxidized polyisoprene; epoxidized poly(1,3-butadiene-acrylonitrile); epoxized soybean oil; epoxidized castor oil; dimethylpentane dioxide; divinylbenzene dioxide; butadiene dioxide; 1,7-octadiene dioxide; and the like.

EXAMPLES

Example 1

Compound C-3, R2=Me

A 500 mL, single-neck flask was charged with 27.63 g (0.20 mole) 2-(4-hydroxyphenyl)ethyl alcohol, 18.02 g (0.25 mole) acrylic acid, 150 mL toluene, 1.5 g methanesulfonic acid, and 0.040 g BHT. The flask was equipped with a Dean-Stark trap, Claisen head, air inlet tube, and condenser; and the mix was refluxed and stirred for 3.6 hours under a slow air sparge. A total of 3.6 mL of water was collected in the trap (equivalent to theory). The flask was then charged with 20.40 g (0.20 mole) acetic anhydride and the new mixture was stirred at 60° C. for fourteen hours. The mixture was neutralized with 35 g sodium bicarbonate plus 5 g water, dried with 12 g anhydrous magnesium sulfate and then passed over 15 g of silica gel. The solvent was removed via rotary evaporator (vacuum followed by an air sparge) to give 46.44 g (99.1% of theory) of a mobile, light yellow liquid. An FTIR was run on this compound and revealed prominent absorptions at 1755, 1724, 1635, 1509, 1407, 1369, 1271, 1181, 1058, 985, 909, and 809 wave numbers. A TGA (10° C. per minute ramp, air purge) on this compound, in the presence of 2% added dicumyl peroxide, revealed a 10.3% weight loss at 300° C., and a decomposition onset at 361° C. A DSC run on the catalyzed compound (again at 10° C. per minute ramp, air purge) had a cure onset of 138.6° C., a cure maxima at 148.7° C., and a cure energy of 223.8 J/g. The cured monomer was found to have a glass transition temperature of 32° C. (DSC inflection point method).

Example 2

Poly(4-Acetoxystyrene) End-Block Thermoplastic Elastomer

A three-neck, 500 mL flask was charged with 14.0 g Flexibloc A-1, 6.1 g 4-acetoxystyrene and 100 mL of toluene. The flask was equipped with a stir bar, a gas inlet, a condenser capped with bubbler, and a temperature probe. The set-up was swept and then later blanketed with argon gas. The mix was stirred and heated at 105° C. for 54 hours. The solution was then poured into a large beaker containing 600 mL of magnetically stirred methanol. The upper methanol phase was decanted off, and the lower precipitated polymeric phase was rinsed with three additional 75 mL portions of fresh methanol. The polymer was then dried at 100° C. for five hours to recover 12.54 g of a clear, light orange, elastomeric solid. The physical properties of this elastomer were significantly different from those of the starting Flexibloc A-1 (which is a very viscous, pourable, tacky, light orange liquid at room temperature). An FTIR was run on this polymer and significant absorbptions were found at 2957, 1731, 1505, 1451, 1370, 1217, 1161, 1064, 1018, 941, 842, and 739 wave numbers. The main carbonyl absorption at 1731 was shifted up by about six wave numbers from the original Flexibloc A-1 absorption at 1725. There was also a shoulder on the main carbonyl absorption centered around 1757. This was consistent with the incorporation of 4-acetoxystyrene into the end-blocks of the elastomer. There were also absorptions at 1505, 1217, and 1017 that were consistent with the presence of the poly(4-acetoxystyrene) end-blocks.

Example 3

Poly(4-Acetoxystyrene-co-Styrene) End-Block Thermoplastic Elastomer

A three-neck, 500 mL flask was charged with 12.0 g Flexibloc A-1, 3.0 g 4-acetoxystyrene, 6.0 g styrene, and 100 mL of toluene. The flask was equipped with a stir bar, a gas inlet, a condenser capped with bubbler, and a temperature probe. The set-up was swept and then later blanketed with argon gas. The mix was stirred and heated at 105° C. for 22.5 hours. The solution was then poured into a large beaker containing 600 mL of magnetically stirred methanol. The upper methanol phase was decanted off, and the lower precipitated polymeric phase was rinsed with three additional 75 mL portions of fresh methanol. The polymer was then dried at 100° C. for nine hours to recover 12.74 g of a clear, light orange, elastomeric solid. The physical properties of this elastomer were again significantly different from those of the starting Flexibloc A-1. An FTIR was run on this polymer and significant absorbptions were found at 2930, 1729, 1452, 1369, 1243, 1157, 1064, 1018, 941, 759, and 700 wave numbers. The main carbonyl absorption at 1727 was shifted up by about six wave numbers from the original Flexibloc A-1 absorption at 1725. There was also a shoulder on the main carbonyl absorption centered around 1766. This was consistent with the incorporation of 4-acetoxystyrene into the end-blocks of the elastomer. There were also absorptions at 1017, 759, and 700 that were consistent with the presence of the poly(4-acetoxystyrene-co-styrene) end-blocks.

Example 4

Poly(4-Acetoxyphenethyl Acrylate-co-t-Butylstyrene) End-Block Thermoplastic Elastomer A three-neck, 500 mL flask was charged with 12.66 g Flexibloc A-1, 5.0 g of the dual functional monomer from Example 1, 10.0 g t-butylstyrene, and 100 mL of toluene. The flask was equipped with a stir bar, a gas inlet, a condenser capped with bubbler, and a temperature probe. The set-up was swept and then later blanketed with argon gas. The mix was stirred and heated at 110° C. for 23.25 hours. The solution was then poured into a large beaker containing 600 mL of magnetically stirred methanol. The upper methanol phase was decanted off, and the lower precipitated polymeric phase was rinsed with three additional 75 mL portions of fresh methanol. The polymer was then dried at 100° C. for 5.5 hours to recover 14.45 g of a clear, almost colorless, elastomeric solid. The physical properties of this elastomer were again significantly different from those of the starting Flexibloc A-1. An FTIR was run on this polymer and significant absorbptions were found at 2961, 1766, 1727, 1510, 1451, 1362, 1167, 1114, 1066, 1018, 941, 910, and 739 wave numbers. The main carbonyl absorption (from the Flexibloc A-1 poly butyl acrylate) at 1727 was not significantly shifted from the original 1725 location, but the carbonyl from the phenyl acetate was resolved at 1766 wave numbers. This was consistent with the incorporation of 4-acetoxyphenethyl acrylate into the end-blocks of the elastomer. There were also absorptions at 1510, 1018, and 910 that were consistent with the presence of the poly(4-acetoxyphenethyl acrylate-co-t-butylstyrene) end-blocks.

What is claimed is:

1. A thermoplastic elastomer comprising at least one hard block segment, wherein the at least one hard block segment comprises units derived from at least one monomer compound having the formula:

I wherein:
X is selected from the group consisting of an acrylate, a methyacrylate, a maleimide and a vinyl ether; and
$R_2$ is selected from the group consisting of methyl, ethyl, propyl, butyl, and phenyl.

2. The thermoplastic elastomer of claim 1, wherein the thermoplastic elastomer contains curative functional groups.

3. The thermoplastic elastomer of claim 1, wherein the at least one hard block segment is repeated.

4. The thermoplastic elastomer of claim 3, wherein the repeated hard block segment comprises units derived from at least one monomer compound having a formula selected from:

C-1

C-2

C-3

C-4

C-5

C-6

C-7 wherein:
$R_1$ is selected from the group consisting of H and methyl; and
$R_2$ is selected from the group consisting of methyl, ethyl, propyl, butyl, and phenyl.

5. A method for synthesizing the thermoplasic elastomer of claim 1, comprising incorporating into the hard segment of a block polymer at least one monomer of formula I

I wherein:
X is selected from the group consisting of an acrylate, a methyacrylate, a maleimide, and a moiety comprising vinyl ether; and
$R_2$ is selected from the group consisting of methyl, ethyl, propyl, butyl, and phenyl.

6. A composition comprising a thermoplastic elastomer of claim 1 and an epoxy.

7. The composition of claim 6, wherein the epoxy is selected from the group consisting of a glycidyl ether epoxy, a cycloaliphatic epoxy, and an aliphatic epoxy.

8. The composition of claim 6, wherein epoxy is selected from the group consisting of a glycidyl ether of a phenol; a glycidyl ether of an amine; a glycidyl ether of an alcohol; a phenyl glycidyl ether; a cresol glycidyl ether; a nonylphenyl glycidyl ether; a p-tert-butylphenyl glycidyl ether; a diglycidyl ether; a trisglycidyl ether of bisphenol A, bisphenol F, ethylidinebisphenol, dihydroxydiphenyl ether, N,N'-disalicylal-ethylenediamine, triglycidyl-p-aminophenol, N,N,N', N'-tetraglycidyl-4,4'-diphenylmethane, triglycidyl isocyanurate, bis(4-hydroxyphenyl)sulfone, bis(hydroxyphenyl)sulfide, 1,1-bis(hydroxyphenyl)cyclohexane, 9,19-bis(4-hydroxyphenyl)fluorene, 1,1,1-tris(hydroxyphenyl)ethane, tetrakis(4-hydrpoxyphenyl)ethane, trihydroxytritylmethane, 4,4'-(1-alpha-methylbenzylidene) bisphenol, 4,4'-(1,3-componentthylethylene)diphenol, componentthylstilbesterol, 4,4'-dihyroxybenzophenone, resorcinol, catechol, or tetrahydroxydiphenyl sulfide; a glycidyl ether of a cresol formaldehyde condensate; a glycidyl ether of a phenol formaldehyde condensate; a glycidyl ether of a cresol dicyclopentadiene addition compound; a glycidyl ether of a phenol dicyclopentadiene addition compound; a glycidyl ether of dihydroxy naphthalene, 2,2'-dihydroxy-6,6'-dinaphthyl disulfide, or 1,8, 9-trihydroxyanthracene; a diglycidyl ether of 1,4 butanediol; a diglycidyl ether of diethylene glycol; a diglycidyl ether of neopentyl glycol; a diglycidyl ether of cyclohexane dimethanol; a diglycidyl ether of tricyclodecane dimethanol; a trimethyolethane triglycidyl ether; a trimethyol propane triglycidyl ether; a glycidyl ether of a polyglycol; a polyglycidyl ether of castor oil; a polyoxypropylene diglycidyl ether; a glycidyl derivative of an aromatic amine; Heloxy 71; and glycidyl methacrylate.

9. The composition of claim 6, wherein the epoxy is selected from the group consisting of cyclohexene oxide; 3-vinylcyclohexene oxide; vinylcyclohexene dioxide; dicylcopentadiene dioxide; tricyclopentadiene dioxide; tetracyclopentadiene dioxide; norbornadiene dioxide; bis(2,3-epoxycyclopentyl) ether; limonene dioxide; 3',4'-epoxycyclohexamethyl-3,4-epoxycyclohexanecarboxylate; 3,4-epoxycyclohexyloxirane; 2(3',4'-epoxycyclohexyl)-5, 1"-spiro-3",4"-epoxycyclohexane-1,3-dioxane; and bis(3,4-epoxycyclohexamethyl) adipate.

10. The composition of claim 6, wherein the epoxy is selected from the group consisting of an epoxidized polybutadiene; an epoxidized polyisoprene; an epoxidized poly(1, 3-butadiene - acrylonitrile); an epoxized soybean oil; an epoxidized castor oil; dimethylpentane dioxide; divinylbenzene dioxide; butadiene dioxide; and 1,7-octadiene dioxide.

11. The composition of claim 6, further comprising a comonomer.

12. The composition of claim 11, wherein the comonomer is selected from the group consisting of styrene, t-butylstyrene, α-methylstyrene, vinyltoluene, methyl acrylate, ethyl acrylate, t-butyl acrylate, tetrahydrofurfuryl acrylate, 2-phenoxyethyl acrylate, glycidyl acrylate, isobornyl acrylate, 3-isobornylcyclohexyl acrylate, tricylcodecane-methyl acrylate, cyclohexyl acrylate, 3,3,5-trimethylcyclohexane acrylate, (3-ethyl-3-oxetanyl)methyl acrylate, N,N-dimethyl acrylamide, methyl methacrylate, ethyl methacrylate, t-butyl methacrylate, tetrahydrofurfuryl methacrylate, 2-phenoxyethyl methacrylate, glycidyl methacrylate, isobornyl methacrylate, 3-isobornylcyclohexyl methacrylate, tricylcodecane-methyl methacrylate, cyclohexyl methacrylate, 3,3,5-trimethylcyclohexane methacrylate, (3-ethyl -3-oxetanyl) methyl methacrylate, N,N-dimethyl methacrylamide, phenyl maleimide, 3-methyphenyl maleimide, 2,4-dimethylphenyl maleimide, 2-methylphenyl maleimide, 4-methylphenyl maleimide, 2-methoxyphenyl maleimide, 3-methoxyphenyl maleimide, 4-methoxyphenyl maleimide, 4-ethoxyphenyl maleimide, 2-ethyl-6-methylphenyl maleimide, 2,6-dimethylphenyl maleimide, 2,6-diethylphenyl maleimide, 2-isopropyl-6-methylphenyl maleimide, 2-phenoxyphenyl maleimide, 4-phenoxyphenyl maleimide, 2,4,6-trichlorophenyl maleimide, 2,4,6-tribromophenyl maleimide, dodecylphenyl maleimide, maleimide, maleic anhydride, phenyl citraconimide, 3-methyphenyl citraconimide, 2,4-dimethylphenyl citraconimide, 2-methylphenyl citraconimide, 4-methylphenyl citraconimide, 2-methoxyphenyl citraconimide, 3-methoxyphenyl citraconimide, 4-methoxyphenyl citraconimide, 4-ethoxyphenyl citraconimide, 2-ethyl-6-methylphenyl citraconimide, 2,6-dimethylphenyl citraconimide, 2,6-diethylphenyl citraconimide, 2-isopropyl-6-methylphenyl citraconimide, 2-phenoxyphenyl citraconimide, 4-phenoxyphenyl citraconimide, 2,4,6-trichlorophenyl citraconimide, 2,4,6-tribromophenyl citraconimide, dodecylphenyl citraconimide, citraconimide, and citraconic anhydride.

13. The composition of claim 6, comprising:
(a) between about 2 weight percent and about 45 weight percent of a thermoplastic elastomer of claim 1; and
(b) the balance of an epoxy.

14. The composition of claim 13, wherein the thermoplastic elastomer of claim 1 comprises about 10 weight percent of the composition.

15. The composition of claim 12, wherein the thermoplastic elastomer of claim 1 comprises about 20 weight percent of the composition.

16. A vulcanized rubber comprising;
(a) between about 30 weight percent and about 55 weight percent of a thermoplastic elastomer of claim 1; and
(b) the balance of an epoxy.

17. The vulcanized rubber of claim 16, wherein the compound of claim 1 comprises about 45 weight percent of the vulcanized rubber.

* * * * *